US008832547B2

(12) United States Patent
Gibson

(10) Patent No.: US 8,832,547 B2
(45) Date of Patent: Sep. 9, 2014

(54) MANAGING KEYBOARD NAVIGATION IN A TABLE

(75) Inventor: Becky Jean Gibson, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 11/843,999

(22) Filed: Aug. 23, 2007

(65) Prior Publication Data

US 2009/0055723 A1    Feb. 26, 2009

(51) Int. Cl.
    *G06F 17/27*    (2006.01)
    *G06F 3/0489*   (2013.01)
    *G06F 17/24*    (2006.01)
    *G06F 17/30*    (2006.01)

(52) U.S. Cl.
    CPC ............ *G06F 3/0489* (2013.01); *G06F 17/245* (2013.01)
    USPC ........... 715/234; 715/205; 715/207; 715/212; 715/227; 715/241

(58) Field of Classification Search
    CPC .................................................. G06F 3/0489
    USPC .................. 715/205, 207, 212, 227, 234, 241
    See application file for complete search history.

(56) References Cited

U.S. PATENT DOCUMENTS

| 5,312,478 | A  | * | 5/1994  | Reed et al. ..................... 715/205 |
| 6,185,582 | B1 | * | 2/2001  | Zellweger et al. ............ 715/212 |
| 6,256,649 | B1 | * | 7/2001  | Mackinlay et al. ........... 715/212 |
| 6,579,324 | B1 | * | 6/2003  | Lowry et al. .................. 715/243 |
| 6,973,625 | B1 |   | 12/2005 | Lupo et al. |
| 6,988,241 | B1 |   | 1/2006  | Guttman et al. |
| 7,013,312 | B2 |   | 3/2006  | Bala et al. |
| 7,562,287 | B1 | * | 7/2009  | Goldstein et al. ............. 715/201 |

OTHER PUBLICATIONS

"User wants to use arrow keys", Published: Jun. 24, 2002, pp. 1-13, www.codingforums.com/archive/index.php/t-642.html.*
"Delimiter", published: Sep. 23, 2006, pp. 1-2, http://web.archive.org/web/20060923090045/http://en.wikipedia.org/wiki/Delimiter.*
Barclay et al., Microsoft TerraServer: A Spatial Data Warehouse, ACM Digital Library 2000, vol. 29, Issue 2, pp. 307-318.
Karlson et al., "FaThumb: A Facet-based Interface for Mobile Search", Proceedings of the SIGCHI conference on Human Factors in computing systems, 2006, Montreal, Canada, pp. 711-720.

* cited by examiner

*Primary Examiner* — Stephen Hong
*Assistant Examiner* — Wilson Tsui
(74) *Attorney, Agent, or Firm* — Yee & Associates, P.C.; Yeen Tham

(57) ABSTRACT

The illustrative embodiments described herein provide an apparatus and method for managing navigation in a table. The process identifies a first location of a current cell in a first dimension using a cell identifier associated with the current cell in response to receiving a keyboard input to the current cell. The process identifies a second location of the current cell in a second dimension using the cell identifier. The process also identifies a location of the current cell in the table using the first location and the second location.

17 Claims, 4 Drawing Sheets

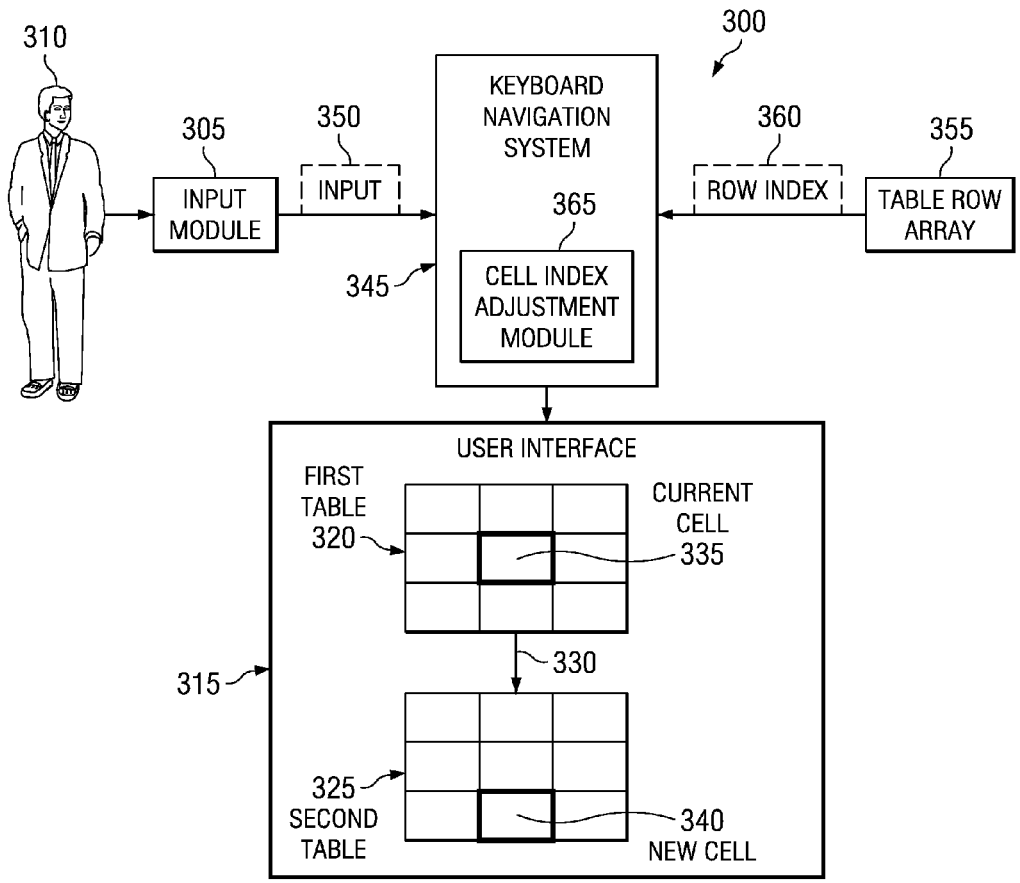

*FIG. 3*

```
                                          400
       <table>                             ↙
          <tr id="rowA">      420
405  {     <td id="rowA(_0">data in first column of rowA</td><td id="rowA(_1">data
      in second column of rowA</td><td id="rowA(_2">data in third column of rowA</td>
          </tr>
          <tr id="rowB">
410  {     <td id="rowB(_0">data in first column of rowB</td><td id="rowB(_1">data
      in second column of rowB</td><td id="rowB(_2">data in third column of rowB</td>
          </tr>
          <tr id="rowC">
           <td id="rowC(_0">data in first column of rowC</td><td id="rowC(_1">data
415  { in second column of rowC</td><td id="rowC(_2">data in third column of rowC</td>
          </tr>
       </table>
```

*FIG. 4*

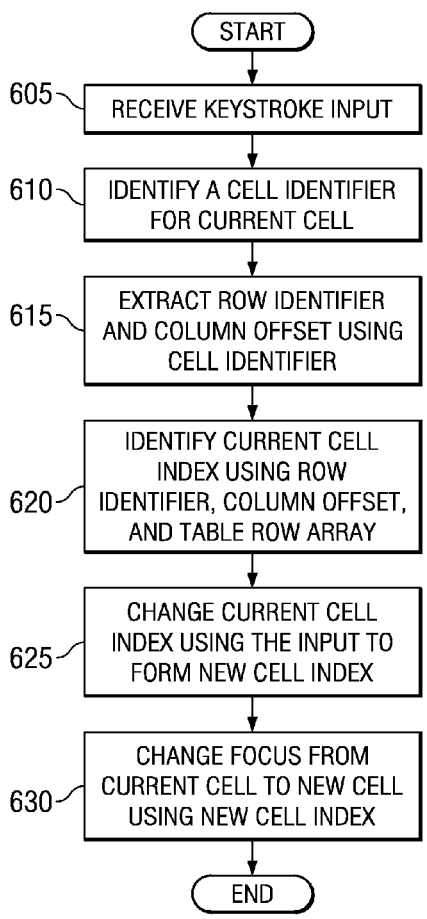
FIG. 5
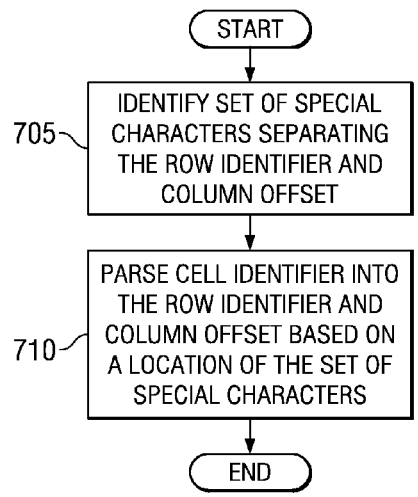
FIG. 7
FIG. 6
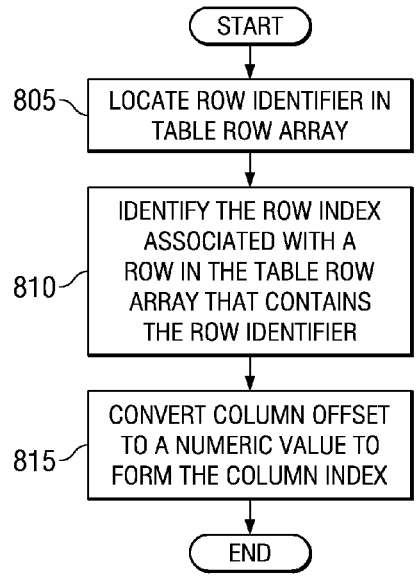
FIG. 8

MANAGING KEYBOARD NAVIGATION IN A TABLE

BACKGROUND OF THE INVENTION

1. Field of the Invention

The present invention relates generally to a data processing system and in particular to a method and apparatus for managing keyboard navigation. More particularly, the present invention is directed to a computer-implemented method, apparatus, and computer-usable program code for managing keyboard navigation in a table.

2. Description of the Related Art

Many computer applications utilize tables, such as data grids, to contain, organize, or display data to a user. For example, many web-based pages on the Internet contain tables with which a user may interact using a user interface, such as a keyboard. One way that a user may interact with a table on a user interface is by navigating from cell to cell within the table. For example, a user may issue directional commands that change the cell having focus within the table. A focus is any indication associated with a particular cell that differentiates the cell from other cells in the table. This indication may be made visually using an output device, such as a display device. Non-limiting examples of a cell upon which focus is applied include a highlighted cell, a cell containing bolded or italicized contents, a cell having a unique border, a blinking cell, or a cell containing a cursor. A directional command is any command indicating a direction, such as up, down, left, right, or diagonal. A directional command may be issued by a user via a keyboard. A keyboard is any user interface containing keys that represent values, such as directional values. Non-limiting examples of a keyboard include a traditional computer keyboard, touchpad, touch screen, or similar interface.

Hypertext markup language (HTML) may be used to create tables for presentation on a user interface. JavaScript™ may also be used to implement a user's interactions with the table. JavaScript™ is a web development scripting language and is a trademark of Sun Microsystems, Inc.

Keyboard navigation within a table on a web page is not a standard HTML function. Nonetheless, languages, such as JavaScript™, may be used to capture keyboard input received by a HTML table element. The next cell to receive focus may then be determined based on the keyboard input. For example, if a user is in row one and column three of a table and presses a down value on a keyboard, the next cell to receive focus is row two and column three. In JavaScript™, the keystroke event for the down value key provides the cell currently receiving focus. In JavaScript™, this current cell may be said to have generated the keystroke event. However, inefficiencies exist when using the current methods for changing focus in a table using keyboard input.

SUMMARY OF THE INVENTION

The illustrative embodiments described herein provide an apparatus and method for managing navigation in a table. The process identifies a first location of a current cell in a first dimension using a cell identifier associated with the current cell in response to receiving a keyboard input to the current cell. The process identifies a second location of the current cell in a second dimension using the cell identifier. The process also identifies a location of the current cell in the table using the first location and the second location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a system for managing keyboard navigation in a table in accordance with an illustrative embodiment;

FIG. 4 is a representation of program code associated with a table in accordance with an illustrative embodiment;

FIG. 5 is a graphical representation of cell identifiers in a table in accordance with an illustrative embodiment;

FIG. 6 is a flowchart illustrating a process for managing keyboard navigation in a table in accordance with an illustrative embodiment;

FIG. 7 is a flowchart illustrating a process for managing keyboard navigation in a table in accordance with an illustrative embodiment;

FIG. 8 is a flowchart illustrating a process for managing keyboard navigation in a table in accordance with an illustrative embodiment.

DETAILED DESCRIPTION OF THE PREFERRED EMBODIMENT

Figure 1:
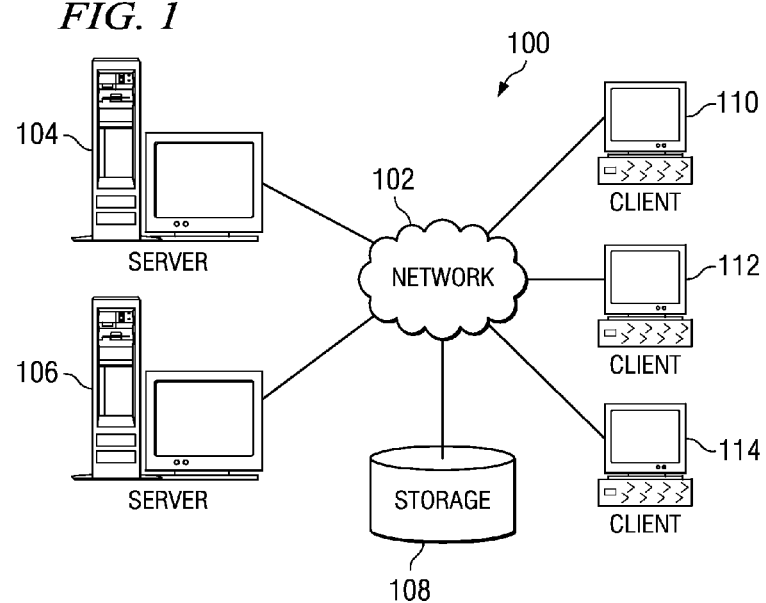
FIG. 1 is a pictorial representation of a network data processing system in which the illustrative embodiments may be implemented.
Figure 2:
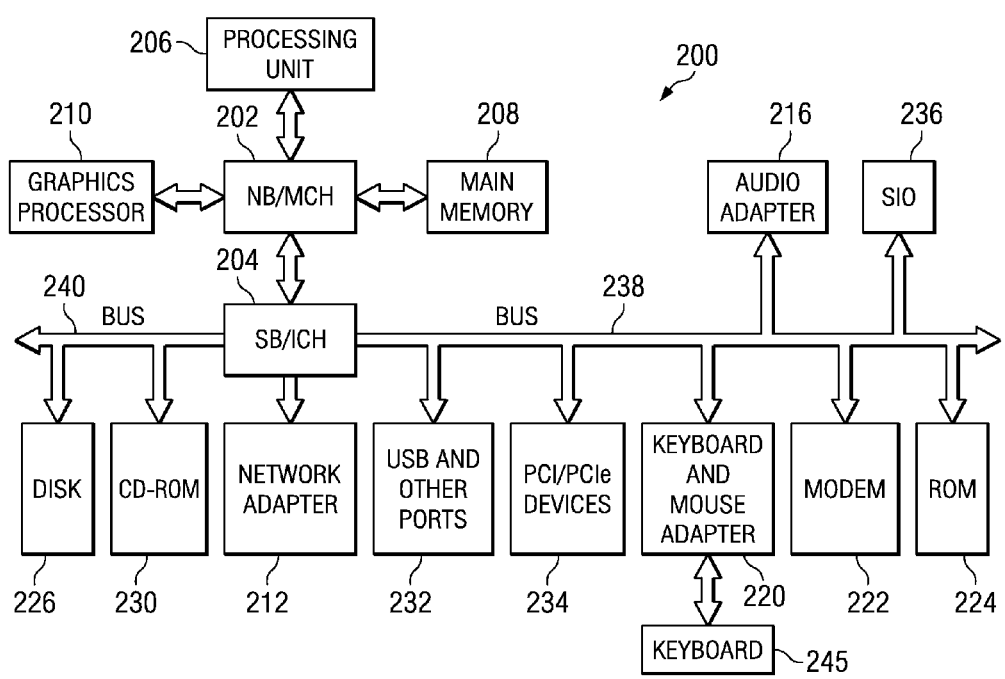
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In one example, any of clients 110, 112 and 114 may display a table or data grid to a user. The table may be transmitted from any of servers 104 and 106 or may be stored on storage 108. In this example, the table may be transmitted over the internet and displayed on any of clients 110, 112 and 114 as part of a web page.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

Data processing system 200 may include a display device, such as a monitor or touch screen, on which a table may be displayed to a user. In this example, keyboard 245 may be used to navigate among the cells contained in the table. For example, keyboard 245 may include keys that have an up, down, left, or right value, such as an up arrow, down arrow, left arrow, or right arrow, respectively. In this example, the directional values on keyboard 245 may be used to navigate among the cells in the table.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system or JavaScript™, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide an apparatus and method for managing navigation in a table. A table is any grid containing two or more cells. Non-limiting examples of a table include a spreadsheet, a chart, a list, a data grid, or a three dimensional table.

The process identifies a first location of a current cell in a first dimension using a cell identifier associated with the current cell in response to receiving a keyboard input to the current cell. The current cell is the cell receiving focus at the time keyboard input is received. In one example, cell identifiers are assigned to cells in a table using the JavaScript™ language. In another example, cell identifiers are assigned to cells in a table using HTML, such as the HTML code used to create the table.

The process identifies a second location of the current cell in a second dimension using the cell identifier. The process also identifies a location of the current cell in the table using the first location and the second location. In one embodiment, the first dimension is a row in the table and the second dimension is a column in the table. In this embodiment, the first location may be a row identifier and the second location may be a column offset.

The process identifies a current cell index using the row identifier, the column offset, and a table row array for the table. In one embodiment, the current cell index comprises a row index and a column index. The row index and column index indicate the row and column of the current cell in the table. A table row array is a set of one or more elements containing information about rows in a table, such as row identifiers used in a table. In one example, the table row array contains row objects that may be manipulated using JavaScript™. In this example, each row object includes information about a row in the table, such as a row identifier for the row. Elements in the table row array may be referenced using indexes. A table row array may be the table.rows[ ] array used in JavaScript™.

In one embodiment, identifying a current cell index using the row identifier, the column offset, and the table row array includes locating the row identifier for the current cell in the table row array. For example, the process may locate the row object in the table row array that includes the row identifier for the current cell. In response to locating the row identifier, the process may then identify the row index associated with a row in the table row array that contains the row identifier. In this embodiment, the process may also convert the column offset to a numeric value to form the column index.

The process also changes the current cell index using the keyboard input to form a new cell index. The new cell index indicates the row and column of the next cell in the table to which focus is applied. Depending on the directional value of the keyboard input, either or both of the row index and column index of the current cell index is adjusted to form the row index and column index of the new cell index. For example, changing the current cell index using the keyboard input to form the new cell index includes decreasing the row index in response to the keyboard input having an up value. In another example, the row index may also be increased in response to the keyboard input having a down value. In another example, the column index may also be decreased in response to the keyboard input having a left value. In another example, the column index may also be increased in response to the keyboard input having a right value. The process changes a focus from the current cell to a new cell using the new cell index.

In another embodiment, the process extracts the row identifier and the column offset using the cell identifier. In this embodiment, the row identifier and column offset are separated by a set of special characters. Also, extracting the row identifier and the column offset using the cell identifier may include parsing the cell identifier into the row identifier and the column offset based on a location of the set of special characters. The set of special character includes one or more character, such as a punctuation, alphanumeric, or symbolic character. In one non-limiting example, the set of characters is an open parenthesis character and an underscore character, or "(_". In another embodiment, the process for managing keyboard navigation in a table is implemented using JavaScript™.

Turning now to FIG. 3, a block diagram of a system for managing keyboard navigation in a table is depicted in accordance with an illustrative embodiment. Specifically, FIG. 3 depicts data processing system 300, which contains components to manage keyboard navigation in a table. Examples of data processing system 300 include data process system 100 in FIG. 1, and data processing system 200 in FIG. 2.

Data processing system 300 includes input module 305. Input module 305 may be any device by which user 310 may input data in data processing system 300. Non-limiting examples of input module 305 include a keyboard, touchpad, touch screen, or similar interface having user-selectable values. In one example, input module 305 includes directional values that may be selected by user 310. In this example, the directional values may be up, down, left, right, or diagonal values. Although FIG. 3 illustrates a single input module 305, data processing system 300 may include any number of input modules that may be used by one or more users. Also, input module 305 may be connected to data processing system 300 over a network, such as network 102 in FIG. 1.

Data processing system 300 includes user interface 315. User interface 315 may be any interface capable of displaying a table to a user. For example, user interface 315 may be a monitor, touch screen, projection, electronic paper, or any other display device. Although FIG. 3 illustrates a single user interface 315, data processing system 300 may include any number of user interfaces. Also, user interface 315 may be connected to data processing system over a network, such as network 102 in FIG. 1.

User interface 315 displays first table 320 and second table 325. First table 320 and second table 325 are two different states of the same table, which has three rows and three columns. Although first table 320 and second table 325 each have three rows and three columns, first table 320 and second table 325 may contain any number of rows and columns. For example, first table 320 and second table 325 may be one row by eight columns, seven rows by one column, or eighteen rows by ten columns. First table 320 and second table 325 may also be three-dimensional matrices having rows, columns, and a cell depth.

Transition 330 represents the transition of first table 320 to second table 325. In first table 320, current cell 335 is shown as receiving focus, as shown by the thickened border of current cell 335. Current cell 335 is located on the second row and second column of first table 320. In second table 325, new cell 340 is shown as receiving focus, as shown by the thickened border of new cell 340. New cell 340 is located on the third row and second column of second table 325.

Data processing system 300 includes keyboard navigation system 345. Keyboard navigation system 345 may be hardware, software, firmware, middleware, or any instructional media for instructing data processing system 300.

In one embodiment, keyboard navigation system 345 receives input 350 from input module 305. For example, input 350 may be directional input. In this example, directional input includes up, down, left, right, and diagonal values, each of which may correspond to an up arrow, down arrow, left arrow, right arrow, or diagonal indicator, respectively.

In response to receiving input 350 to current cell 335, keyboard navigation system 345 identifies a first location of current cell 335 in a first dimension using a cell identifier associated with the current cell. Keyboard navigation system 345 also identifies a second location of current cell 335 in a second dimension using the cell identifier. In one embodiment, the first dimension is a row in the table and the second dimension is a column in the table. In this embodiment, the first location may be a row identifier and the second location may be a column offset.

In an alternate embodiment, the first dimension is a column in the table and the second dimension is a row in the table. In this embodiment, the first location may be a column offset and the second location may be a row identifier.

Current cell 335 is the cell receiving focus at the time keyboard input is received. For example, in JavaScript™, the receipt of input 350 is a key event that is associated with an event object. An event object is data associated with a particular event, such as a key press. JavaScript™ may then obtain a cell object for current cell 335 from the event object. The cell object may then be stored in a variable, such as cellObject, so that the cell object may be referenced at a later time. In JavaScript™, a cell object is data associated with a particular cell in a table or data grid, such as current cell 335.

In one embodiment, the cell object for a particular cell includes data that indicates a cell identifier for the particular cell, such as current cell 335. Each cell in first table 320 is associated with a cell identifier. The cell identifier for each cell in first table 320 includes a row identifier and a column offset. The row identifier may be a unique string value for each row in first table 320. The column offset may be a string value containing a number that indicates the offset of the particular column from the first column. In one example, the first column in first table 320 has a column offset of zero. Non-limiting examples of a cell identifier include rowA(_3, genid_7(_3, and name::0. Additional details regarding the association of cells with cell identifiers will be discussed in further detail with respect to FIGS. 4 and 5 below.

In one embodiment, keyboard navigation system 345 uses the cell object to identify the cell identifier for current cell 335. For example, keyboard navigation system 345 may extract the cell identifier from the cell object for current cell 335 using the following JavaScript™ syntax:

var cellId=cellObject.id

Keyboard navigation system 345 also extracts the row identifier and the column offset using the cell identifier. For example, the row identifier and column offset, as contained in the cell identifier, may be separated by a set of special characters. The set of special characters may include one or more characters, such as a punctuation, alphanumeric, or symbolic character. In one non-limiting example, the set of characters is an open parenthesis character and an underscore character, or "(_".

Further, keyboard navigation system 345 may extract the row identifier and the column offset from the cell identifier by parsing the cell identifier into the row identifier and the column offset based on a location of the set of special characters. In one example, the cell identifier may be parsed into a row identifier and column offset using the JavaScript™ split command. The split command splits a string based on the characters indicated in the split command. An example of the JavaScript™ split command in which the characters "(_" are indicated is as follows:

var idArray=cellId.split("(_")

The split command also includes the separated parts of the cell identifier into an array. Thus, in the example of a cell identifier containing a row identifier and column offset separated by the "(_" characters, the row identifier and column offset may be included in an array as two elements. In this example, the row identifier and column offset may be assigned to an array in the following manner:

idArray[0]=rowId
    idArray[1]=colOffset

As another example, assuming that current cell 335 has a cell identifier of "rowB(_1", keyboard navigation system 345 may parse the cell identifier for current cell 335 into row identifier "rowB" and column offset "1". Keyboard navigation system 345 may then include into row identifier "rowB" and column offset "1" in an array as follows:

idArray[0]=rowB
    idArray[1]=1

In one embodiment, keyboard navigation system 345 identifies a table object for the table in which the current cell is located. For example, keyboard navigation system 345 may use standard Document Object Model and JavaScript™ to identify a table object for first table 320, which contains current cell 335. In this example, the table object may be obtained from the cell object for current cell 335. A table object includes data associated with a particular table in a table or data grid, such as first table 320. For example, the table object may contain table row array 355 of the rows in first table 320. In one example, table row array 355 is an array of rows objects, and is included in the table object for first table 320. In this example, the each rows object in the array of rows objects corresponds to a row in first table 320. Table row array 355 may be indicated in JavaScript™ as "tableObject.rows". Each row object in table row array 355 has a cells array that contains all of the cell objects in the row corresponding to the row object. In one example, the cells array is the array of cells in a row, and may be indicated in JavaScript™ as "row.cells".

Table row array 355 is a set of one or more elements containing information about the rows in first table 320, such as the row identifiers used in first table 320. Each row in table row array 355 is referenced using indexes. In one example, table row array 355 may be the table.rows[ ] array used in JavaScript™.

Keyboard navigation system 345 identifies the location of current cell 335 in first table 320 using the first location and the second location. In one example, the first location is a row identifier, the second location is a column offset, and the location is a current cell index. The current cell index includes a row index and a column index for current cell 335. In this example, keyboard navigation system 345 may use the row identifier and the column offset to identify the current cell index for current cell 335.

In one embodiment, keyboard navigation system 345 may identify a current cell index for current cell 335 using the row identifier, the column offset, and table row array 355. In one example, keyboard navigation system 345 locates the row identifier for current cell 335 in table row array 355. In response to locating the row identifier for current cell 335 in table row array 355, keyboard navigation system 345 identifies or receives row index 360, which is associated with a row in table row array 355 that contains the row identifier for current cell 335. Keyboard navigation system 345 may search through the table row array until the row with the row identifier for current cell 335 is found. In one non-limiting example, keyboard navigation system 345 may use JavaScript™ to search through table row array 355 as follows:

```
var rows = parentTable.rows; //given the table
object, get the rows object
var rowIndex = -1;
// loop through the table row array until the
desired row identifier is found for the current
row object
for (var i=0; i<rows.length; i++) {
    if (rows[i].id == rowId) {
        rowIndex = i;
        break;
    }
}
```

After performing this function, the rowIndex variable contains the index of the current row within the table row array, which contains the row identifier for current cell 335. Thus, keyboard navigation system 345 may use the JavaScript™ function rows [rowsIndex] to obtain the current row object that contains current cell 335. Because keyboard navigation system 345 searches for the row identifier in table row array 355 to find row index 360 for the row containing the row identifier, the current row object may be obtained for current cell 335 even if the rows in first table 320 are sorted or re-arranged.

Keyboard navigation system 345 also converts the column offset to a numeric value to form the column index. In one example, the column offset as contained in the cell identifier is a string value. In this example, keyboard navigation system 345 may convert the column offset string value into a numeric value using the standard JavaScript™ parseInt( ) function as follows:

var colIdx=parseInt(idArray[1],0);

In this example, the colIdx variable now contains a column index that is a number value that corresponds to the column offset of the current cell, such as current cell 335.

In one embodiment, the column offset may be converted from a string value to a number value in the same function that parses the cell identifier, as shown in the following example:

```
// var srcCell = the current cell;
var info = scrCell.id.split("_");
var rowId = into[0];
var colIdx = parseInt(info[1], 0);
```

In this example, scrCell.id is the cell identifier for the current cell. The colIdx variable now contains a column index that is a number value that corresponds to the column offset of the current cell srcCell.

Unlike existing techniques, the illustrative embodiments eliminate the need to search every cell in a table that is positioned before the current cell. Existing techniques for managing keyboard navigation use the objects built into JavaScript™ and search each object for the current object. JavaScript™ provides access to an array of all of the rows in a table and all of the cells in each row. The existing technique then loops through all of the cells in each row to find the current cell. Once the current cell has been found, the method determines the next cell to receive focus based on the directional value of the arrow key pressed and adjusts the focus accordingly. However, this existing technique requires additional computing resources and time because every cell in the table, which occurs before the current cell, must be searched in order to find the current cell. Thus, in an example in which the current cell is located on row twenty-five, column nine of the table, every cell that is located before row twenty-five, column nine would have to be searched before finding the current cell.

Another existing technique for managing keyboard navigation uniquely identifies each cell in the table with a row number and column offset. This existing technique uses the uniquely identified cells to calculate the current cell and the next cell to receive focus. For example, if a cell is identified as "r1c3," then the cell one row down is calculated to be "r1(+1)c3" or "r2c3." The cell to the right of the current cell is calculated as "r1c4." However, because this existing technique does not search for the row index using the table row array, this existing technique does not account for the repositioning of cells within the table. Therefore, this technique will not work in a table in which the data has been sorted or the data does not otherwise remain in a constant position in the table. However, the illustrative embodiment allows a current cell to be found regardless of whether the data in a table has been sorted or repositioned.

Data processing system 300 includes cell index adjustment module 365. Upon obtaining the current cell index, which includes row index 360 and column index, for current cell 335 as indicated above, cell index adjustment module 365 changes the current cell index using the keyboard input to form a new cell index. In one example, cell index adjustment module 365 decreases row index 360 in response to input 350 having an up value. Cell index adjustment module 365 may decrease row index 360 by any number of units, such as one, five, or ten. In this example, the up value of input 350 may correspond to user 310 pressing an up arrow on input module 305. Also, if row index 360 is less than zero after being decreased by cell index adjustment module 365, then cell index adjustment module 365 may set row index 360 to zero, which corresponds to the top row of the table. Thus, the focus remains at the top of the table and does not wrap around to another end of the table.

In another example, cell index adjustment module 365 increases row index 360 in response to input 350 having a down value. Cell index adjustment module 365 may increase row index 360 by any number of units, such as one, five, or ten. In this example, the down value of input 350 may correspond to user 310 pressing a down arrow on input module 305. If row index 360 exceeds the number of rows in the table after being increased by cell index adjustment module 365, then cell index adjustment module 365 may set row index 360 to a value corresponding to the bottom row of the table, as in the following example:

```
if rowIndex >= rows.length,
    then rowIndex = rows.length−1
```

In this example, because rows.length indicates the number of rows in the table starting with row zero, the value 'rows.length−1' corresponds to the bottom row of the table. Thus, the focus remains at the bottom of the table and does not wrap around to another end of the table.

In another example, cell index adjustment module 365 decreases the column index in response to input 350 having a left value. Cell index adjustment module 365 may decrease the column index by any number of units, such as one, five, or ten. In this example, the left value of input 350 may correspond to user 310 pressing a left arrow on input module 305. If the column index is less than zero after being decreased by cell index adjustment module 365, then cell index adjustment module 365 may set the column index to zero, which corresponds to the leftmost column of the table. Thus, the focus remains at the left end of the table and does not wrap around to another end of the table.

In another example, cell index adjustment module 365 increases the column index in response to input 350 having a right value. Cell index adjustment module 365 may increase the column index by any number of units, such as one, five, or ten. In this example, the right value of input 350 may correspond to user 310 pressing a right arrow on input module 305. If the column index exceeds the number of columns in the table after being increased by cell index adjustment module 365, then cell index adjustment module 365 may set the column index to a value corresponding to the rightmost column of the table, as in the following example:

```
if colIdx >= rows[rowIndex].cells.length,
    then colIdx = rows[rowIndex].cells.length−1
```

In this example, because rows[rowIndex].cells.length indicates the number of cells in a row in the table starting with cell zero, the value 'rows[rowIndex].cells.length−1' corresponds to the rightmost column of the table. Thus, the focus remains at the right end of the table and does not wrap around to another end of the table.

In another example, cell index adjustment module 365 may perform any combination of the aforementioned operations on the row index and column index, such as when input 350 is a diagonal or intermediate value. Depending on input 350, either, neither, or both of the row index and column index may be changed to form the new cell index.

Using the new cell index, keyboard navigation system 345 changes the focus from current cell 335 to new cell 340. The focus on current cell 335 in first table 320 is moved downward by one cell to new cell 340. First table 320 and second table 325 are the same table at two different points in time. First table 320 becomes second table 325 in response to keyboard navigation system 345 changing the focus from current cell 335 to new cell 340.

New cell 340 may be obtained from a rows and cells array using the new cell index, as follows:

```
var newRow = rows[rowIndex];
var newCell = newRow.cells[colIdx];
```

In the example illustrated in FIG. 3, the current cell index of current cell 335 has a row index of one and a column index of one, as identified by keyboard navigation system 345. In this example, input 350 has a down value. Using input 350, cell index adjustment module 365 increases the row index by one to form a new cell index for new cell 340. The new cell index for new cell 340 has a row index of two and a column index of one. Keyboard navigation system 345 applies the focus to new cell 340 using the new cell index.

The illustrative embodiments provide an ability to manage keyboard navigation within a table, such as a data grid in a document, file, or web page. Specifically, the illustrative embodiment decreases the time and computing resources that are necessary to locate the current cell by eliminating the need to loop or search through all of the cells that occur before the current cell in a table. Also, because the illustrative embodiments search the table row array to determine a row index, the current cell may be located regardless of whether the rows within a table have been sorted or repositioned. Hence, the features described with respect to the different embodiments provide for keyboard navigation in tables that is faster to process, easier to manage and more resilient against changes that occur within the table.

Turning now to FIG. 4, a representation of program code associated with a table is depicted in accordance with an illustrative embodiment. Specifically, table code 400 is an example of hypertext markup language (HTML) code that may be used to generate first table 320 or second table 325 in FIG. 3.

As shown in FIG. 4, table code 400 uses HTML <TABLE>, <TR>, <TH>, and <TD> elements to generate a table. <THEAD> and <TBODY> may optionally be used to create the table as well. Additional elements may also be contained with the <TH> and <TD> elements as well. <TH> is generally used to define the first row or header columns in a table, while <TD> is used to define cells. Each <TH> and <TD> element contained in a <TR> element is given a unique identifier that may include the unique identifier for the parent <TR> element and the column offset of the cell.

In table code 400, code portion 405 is used to generate the first row of the table, which is identified as 'rowA'. Code portion 410 is used to generate the second row of the table, which is identified as 'rowB'. Code portion 415 is used to generate the third row of the table, which is identified as 'rowC'. Each of code portions 405, 410, and 415 define the cells contained in each respective row, and also contains a cell identifier for each defined cell.

In table code 400, each <TD> element, which defines a cell, includes a cell identifier that contains the cell's row identifier and column offset. For example, code portion 420 includes a cell identifier of "rowA(_0" for the cell that is located in the first row and first column of the defined table. In this example, "rowA" corresponds to the row identifier for the cell, and "0" corresponds to the column offset of the cell. The row identifier and column offset in code portion 420 are separated by the "(_" characters.

Turning now to FIG. 5, a graphical representation of cell identifiers in a table is depicted in accordance with an illustrative embodiment.

Specifically, table 500 is a graphical representation of the cell identifiers for a table, such as first table 320 or second table 325 in FIG. 3, or table code 400 in FIG. 4.

Table 500 illustrates the association between each cell and each cell's respective cell identifier in the table generated by table code 400 in FIG. 4. For example, cell identifier 520 is associated with the cell that is located in the first row and first column of the defined table. Cell identifier 520 is an example of the cell identifier defined by the <TD> element in code portion 420 in FIG. 4.

Turning now to FIG. 6, a flowchart illustrating a process for managing keyboard navigation in a table is depicted in accordance with an illustrative embodiment. The process illustrated in FIG. 6 may be implemented by a keyboard navigation system, such as keyboard navigation system 345 in FIG. 3.

The process begins by receiving keystroke input (step 605). The process identifies a cell identifier for the current cell (step 610). The process extracts a row identifier and column offset using the cell identifier for the current cell (step 615).

The process identifies the current cell index using the row identifier, the column offset, and the table row array for the table (step 620). The current cell index includes a row index and a column index. The process changes the current cell index using the keyboard input to form a new cell index (step 625). The process also changes the focus from the current cell to a new cell using the new cell index (step 630). The process then terminates.

Turning now to FIG. 7, a flowchart illustrating a process for managing keyboard navigation in a table is depicted in accordance with an illustrative embodiment. The process illustrated in FIG. 7 may be implemented by a keyboard navigation system, such as keyboard navigation system 345 in FIG. 3. The process illustrated in FIG. 7 also provides additional steps that may be included in step 615 of FIG. 6, in which the process extracts a row identifier and column offset using the cell identifier for the current cell.

The process begins by identifying a set of special characters separating the row identifier and the column offset (step 705). The process also parses the cell identifier into a row identifier and column offset based on the location of the set of special characters within the cell identifier (step 710). The process then terminates.

Turning now to FIG. 8, a flowchart illustrating a process for managing keyboard navigation in a table is depicted in accordance with an illustrative embodiment. The process illustrated in FIG. 8 may be implemented by a keyboard navigation system, such as keyboard navigation system 345 in FIG. 3. The process illustrated in FIG. 8 also provides additional steps that may be included in step 620 of FIG. 6, in which the process identifies the current cell index using the row identifier, the column offset, and the table row array for the table.

The process begins by locating the row identifier in the table row array (step 805). The process identifies the row index associated with a row in the table row array that contains the row identifier (step 810). The process also converts the column offset to a numeric value to form the column index (step 815). The process then terminates.

Figure 9:
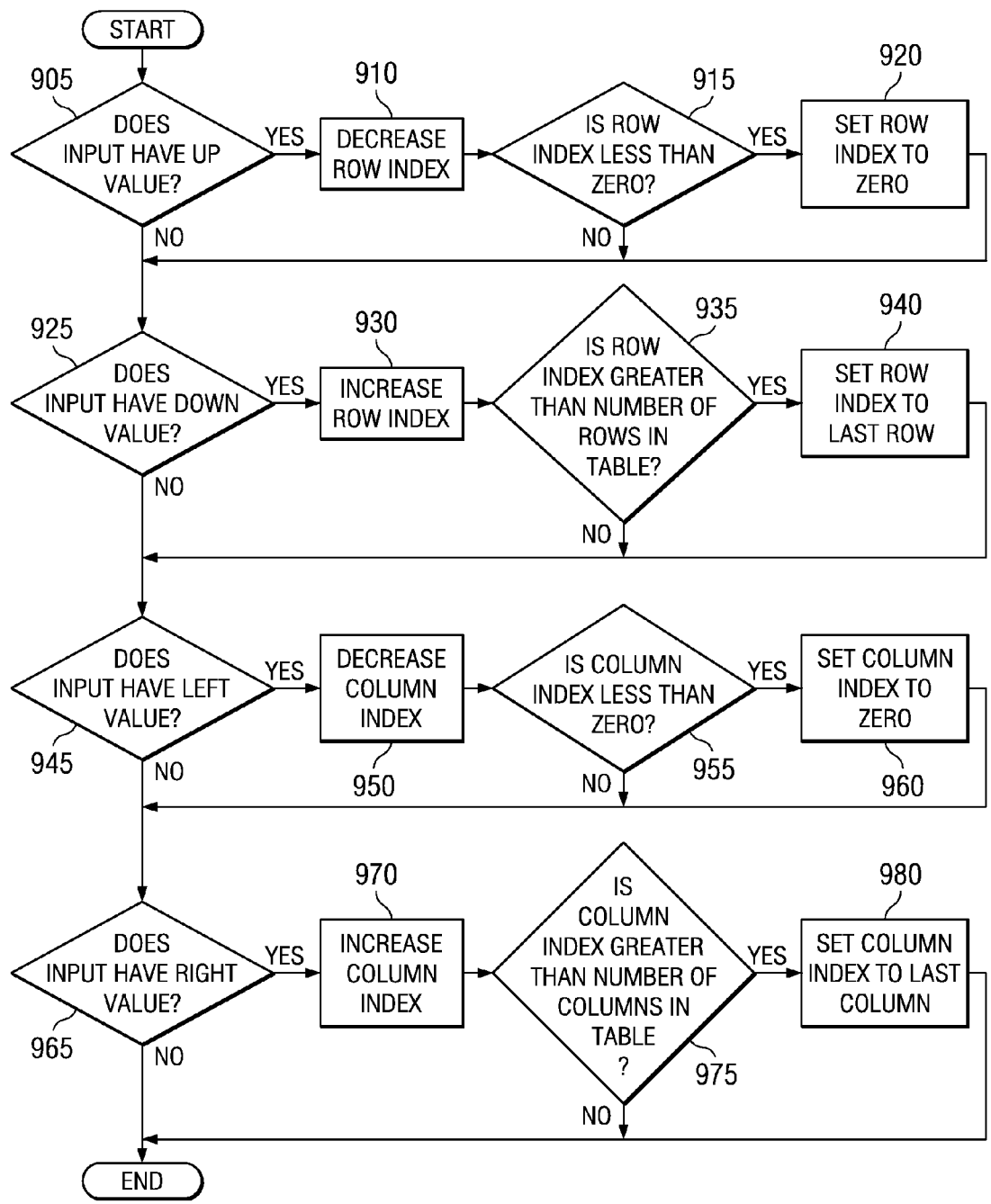
FIG. 9 is a flowchart illustrating a process for managing keyboard navigation in a table in accordance with an illustrative embodiment.

Turning now to FIG. 9, a flowchart illustrating a process for managing keyboard navigation in a table is depicted in accordance with an illustrative embodiment. The process illustrated in FIG. 9 may be implemented by a cell index adjustment module, such as cell index adjustment module 365 in FIG. 3. The process illustrated in FIG. 9 also provides additional steps that may be included in step 625 of FIG. 6, in which the process changes the current cell index using the keyboard input to form a new cell index.

The process begins by determining whether the keyboard input has an up value (step 905). In one example, the up value is associated with an up arrow on a keyboard. If the process determines that the keyboard input has an up value, the process decreases the row index (step 910). The process may decrease the row index by one unit.

The process determines whether the row index is less then zero (step 915). If the process determines that the row index is less then zero, the process sets the row index to zero (step 920). The process then proceeds to step 925. Returning to step 915, if the process determines that the row index is not less than zero, then the process proceeds to step 925. Returning to step 905, if the process determines that the keyboard input does not have an up value, then the process proceeds to step 925. In an alternate embodiment, if the process determines that the keyboard input does not have an up value, then the process terminates.

The process determines whether the keyboard input has a down value (step 925). In one example, the down value is associated with a down arrow on a keyboard. If the process determines that the keyboard input has a down value, the process increases the row index (step 930). The process may increase the row index by one unit.

The process determines whether the row index is greater than the number of rows in the table (step 935). If the process determines that the row index is greater than the number of rows in the table, then the process sets the row index to a value corresponding to the last row in the table (step 940). In one example, the row index is set to a value corresponding to the last row in the table using the following JavaScript™ syntax:
    newRowIdx=rows.length-1
In this example, because 'rows.length' indicates the number of rows in the table starting with row zero, the value 'rows.length-1' corresponds to the last row of the table. The process then proceeds to step 945. Returning to step 935, if the process determines that the row index is not greater than the number of rows in the table, then the process proceeds to step 945. Returning to step 925, if the process determines that the keyboard input does not have a down value, then the process proceeds to step 945. In an alternate embodiment, if the process determines that the keyboard input does not have a down value, then the process terminates.

The process determines whether the keyboard input has a left value (step 945). In one example, the left value is associated with a left arrow on a keyboard. If the process determines that the keyboard input has a left value, the process decreases the column index (step 950). The process may decrease the column index by one unit.

The process determines whether the column index is less than zero (step 955). If the process determines that the column index is less then zero, the process sets the column index to zero (step 960). The process then proceeds to step 965. Returning to step 955, if the process determines that the column index is not less than zero, then the process proceeds to step 965. Returning to step 945, if the process determines that the keyboard input does not have a left value, then the process proceeds to step 965. In an alternate embodiment, if the process determines that the keyboard input does not have a left value, then the process terminates.

The process determines whether the keyboard input has a right value (step 965). In one example, the right value is associated with a right arrow on a keyboard. If the process determines that the keyboard input has a right value, the process increases the column index (step 970). The process may increase the column index by one unit.

The process determines whether the column index is greater than the number of columns in the table (step 975). If the process determines that the column index is greater than the number of columns in the table, then the process sets the column index to a value corresponding to the last column in the table (step 980). In one example, the column index is set to a value corresponding to the last column in the table using the following JavaScript™ syntax:
    newColIdx=cells.length-1
In this example, because 'cells.length' indicates the number of cells in a row in the table starting with cell zero, the value 'cells.length-1' corresponds to the last column of the table. The process then terminates.

Returning to step 975, if the process determines that the column index is not greater than the number of columns in the table, then the process terminates. Returning to step 965, if the process determines that the keyboard input does not have a right value, then the process terminates. In an alternate embodiment, if the process determines that the keyboard input does not have a right value, then the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide an apparatus and method for managing navigation in a table. The process identifies a first location of a current cell in a first dimension using a cell identifier associated with the current cell in response to receiving a keyboard input to the current cell. The current cell is the cell receiving focus at the time keyboard input is received. In one example, cell identifiers are assigned to cells in a table using the JavaScript™ language. In another example, cell identifiers are assigned to cells in a table using HTML, such as the HTML code used to create the table.

The process identifies a second location of the current cell in a second dimension using the cell identifier. The process also identifies a location of the current cell in the table using the first location and the second location. In one embodiment, the first dimension is a row in the table and the second dimension is a column in the table. In this embodiment, the first location may be a row identifier and the second location may be a column offset.

The process identifies a current cell index using the row identifier, the column offset, and a table row array for the table. In one embodiment, the current cell index comprises a row index and a column index. The row index and column index indicate the row and column of the current cell in the table. In one example, a table row array may be the table.rows[ ] array used in JavaScript™.

In one embodiment, identifying a current cell index using the row identifier, the column offset, and the table row array includes locating the row identifier in the table row array. In response to locating the row identifier, the process may then identify the row index associated with a row in the table row array that contains the row identifier. In this embodiment, the process may also convert the column offset to a numeric value to form the column index.

The process also changes the current cell index using the keyboard input to form a new cell index. The new cell index indicates the row and column of the next cell in the table to which focus is applied. Depending on the directional value of the keyboard input, either or both of the row index and column index of the current cell index is adjusted to form the row index and column index of the new cell index. For example, changing the current cell index using the keyboard input to form the new cell index includes decreasing the row index in response to the keyboard input having an up value. In another example, the row index may also be increased in response to the keyboard input having a down value. In another example, the column index may also be decreased in response to the keyboard input having a left value. In another example, the column index may also be increased in response to the keyboard input having a right value. The process changes a focus from the current cell to a new cell using the new cell index.

In another embodiment, the process extracts the row identifier and the column offset using the cell identifier. In this embodiment, the row identifier and column offset are separated by a set of special characters. Also, extracting the row identifier and the column offset using the cell identifier may include parsing the cell identifier into the row identifier and the column offset based on a location of the set of special characters. In one non-limiting example, the set of characters is an open parenthesis character and an underscore character, or "(_". In another embodiment, the process for managing keyboard navigation in a table is implemented using JavaScript™.

The illustrative embodiments provide an ability to manage keyboard navigation within a table, such as a data grid in a document, file, or web page. Specifically, the illustrative embodiment decreases the time and computing resources that are necessary to locate the current cell by eliminating the need to loop or search through all of the cells that occur before the current cell in a table. Also, because the illustrative embodiments search the table row array to determine a row index, the current cell may be located regardless of whether the rows within a table have been sorted or repositioned. Hence, the features described with respect to the different embodiments provide for keyboard table navigation that is faster to process, easier to manage, and more resilient against changes that occur within the table.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing navigation in a table, the computer-implemented method comprising:
retrieving a table object that includes data associated with the table in the webpage, the table object having an indexed array of row objects, each of the row objects containing a unique row identifier assigned to a respective row of the table;
responsive to receiving a keystroke input for the table, obtaining a cell identifier assigned to a current cell of the table, wherein a different cell identifier is assigned to each cell in the table;
parsing a row identifier and a column offset from the cell identifier;
searching through the array of row objects until the row identifier matches the first unique row identifier of a first row object;
responsive to the row identifier matching the first unique row identifier of the first row object, identifying a first index of the first row object, wherein the first index of the first row object indicates a position of the first row object within the array of row objects independent of rows of the table being sorted or re-arranged;

identifying a current cell index of the current cell using the first index of the first row object and the column offset; and obtaining the current cell using the current cell index.

2. The computer-implemented method of claim 1, further comprising:

determining a second index for a second row object within the array of row objects based upon the first index, wherein the second index is determined by adjusting a value of the first index by at least one unit, wherein a direction of adjusting the value is based upon a direction value associated with the keystroke input;

responsive to determining the second index, identifying a second unique row identifier of the second row object;

determining a new cell index based upon the second unique row identifier and the column offset; and changing a focus from the current cell to a new cell using the new cell index.

3. The computer-implemented method of claim 2, wherein adjusting the value of the first index by at least one unit further comprises:

decreasing the value of the first index.

4. The computer-implemented method of claim 2, wherein adjusting the value of the first index by at least one unit further comprises:

increasing the value of the first index.

5. The computer-implemented method of claim 1, further comprising:

extracting the first unique row identifier and the column offset using the cell identifier.

6. The computer-implemented method of claim 5, wherein the first unique row identifier and the column offset are separated by a set of special characters, and wherein the extracting further comprises:

parsing the cell identifier into the first unique row identifier and the column offset based on a particular location of the set of special characters.

7. The computer-implemented method of claim 6, wherein the set of special characters includes an open parenthesis character and an underscore character.

8. The computer-implemented method of claim 1, further comprising:

determining a new column offset based upon the column offset, wherein the new column offset is determined by adjusting a value of the column offset by at least one unit, wherein a direction of adjusting the value is based upon a direction value associated with the keystroke input;

determining a new cell index based upon the first index of the first row object and the new column offset; and changing a focus from the current cell to a new cell using the new cell index.

9. The computer-implemented method of claim 8, wherein adjusting a value of the column offset by at least one unit further comprises:

decreasing the value of the column offset.

10. The computer-implemented method of claim 8, wherein adjusting a value of the column offset by at least one unit further comprises:

increasing the value of the column offset.

11. A computer program product for managing navigation in a table, the computer program product comprising:

a non-transitory computer-usable storage medium having computer-usable program code embodied therewith, the computer-usable program code comprising:

computer-usable program code for retrieving a table object that includes data associated with the table in the webpage, the table object having an indexed array of row objects, each of the row objects containing a unique row identifier assigned to a respective row of the table;

computer-usable program code, responsive to receiving a keystroke input for the table, for obtaining a cell identifier assigned to a current cell of the table, wherein a different cell identifier is assigned to each cell in the table;

computer-usable program code for parsing a row identifier and a column offset from the cell identifier;

computer-usable program code for searching through the array of row objects until the row identifier matches the first unique row identifier of a first row object;

computer-usable program code for responsive to the row identifier matching the first unique row identifier of the first row object, identifying a first index of the first row object, wherein the first index of the first row object indicates a position of the first row object within the array of row objects independent of rows of the table being sorted or re-arranged;

computer-usable program code for identifying a current cell index of the current cell using the first index of the first row object and the column offset; and computer-usable program code for obtaining the current cell using the current cell index.

12. The computer program product of claim 11, further comprising:

computer-usable program code for extracting the first unique row identifier and the column offset using the cell identifier.

13. The computer program product of claim 11, further comprising:

computer-usable program code for determining a second index for a second row object within the array of row objects based upon the first index, wherein the second index is determined by adjusting a value of the first index by at least one unit, wherein a direction of adjusting the value is based upon a direction value associated with the keystroke input;

computer-usable program code for responsive to determining the second index, identifying a second unique row identifier of the second row object;

computer-usable program code for determining a new cell index based upon the second unique row identifier and the column offset; and computer-usable program code for changing a focus from the current cell to a new cell using the new cell index.

14. The computer program product of claim 11, wherein the first unique row identifier and the column offset are separated by a set of special characters, and wherein the computer program product further comprises:

computer-usable program code for parsing the cell identifier into the first unique row identifier and the column offset based on a particular location of the set of special characters.

15. The computer program product of claim 11, further comprising:

computer-usable program code for determining a new column offset based upon the column offset, wherein the new column offset is determined by adjusting a value of the column offset by at least one unit, wherein a direction of adjusting the value is based upon a direction value associated with the keystroke input;

computer-usable program code for determining a new cell index based upon the first index of the first row object and the new column offset; and computer-usable program code for changing a focus from the current cell to a new cell using the new cell index.

16. A data processing system comprising:
a bus system;
a memory connected to the bus system, wherein the memory includes a set of instructions; and
a processing unit connected to the bus system, wherein the processing unit executes the set of instructions to:
retrieve a table object that includes data associated with the table in the webpage, the table object having an indexed array of row objects, each of the row objects containing a unique row identifier assigned to a respective row of the table;
obtain a cell identifier assigned to a current cell of the table in response to receiving a keystroke input for the table, wherein a different cell identifier is assigned to each cell in a table;
parse a row identifier and a column offset using the cell identifier;
search through the array of row objects until the row identifier matches the first unique row identifier of a first row object;
responsive to the row identifier matching the first unique row identifier of the first row object, identify a first index of the first row object, wherein the first index of the first row object indicates a position of the first row object within the array of row objects independent of rows of the table being sorted or re-arranged;
identify a current cell index of the current cell using the first index of the first row object and the column offset; and
obtain the current cell using the current cell index.

17. The data processing system of claim 16, wherein the processing unit further executes the set of instructions to:
determine a second index for a second row object within the array of row objects based upon the first index, wherein the second index is determined by adjusting a value of the first index by at least one unit, wherein a direction of adjusting the value is based upon a direction value associated with the keystroke input;
responsive to determining the second index, identify a second unique row identifier of the second row object;
determine a new cell index based upon the second unique row identifier and the column offset; and
change a focus from the current cell to a new cell using the new cell index.

* * * * *